No. 719,606. PATENTED FEB. 3, 1903.
P. W. NELSON & C. STABERG.
UTENSIL FOR PEELING OR OTHERWISE PREPARING VEGETABLES OR FRUITS.
APPLICATION FILED FEB. 27, 1902.
NO MODEL.

Witnesses
Edward C. Rowland
William Fox

Peter W. Nelson
Carl Staberg
Inventors
By their Attorney
Phillips Abbott

UNITED STATES PATENT OFFICE.

PETER W. NELSON AND CARL STABERG, OF BROOKLYN, NEW YORK.

UTENSIL FOR PEELING OR OTHERWISE PREPARING VEGETABLES OR FRUITS.

SPECIFICATION forming part of Letters Patent No. 719,606, dated February 3, 1903.

Application filed February 27, 1902. Serial No. 95,869. (No model.)

*To all whom it may concern:*

Be it known that we, PETER W. NELSON, residing at No. 327 Seventy-eighth street, and CARL STABERG, residing at No. 388 Atlantic avenue, borough of Brooklyn, county of Kings, city and State of New York, citizens of the United States, have jointly invented a simple, new, and useful Utensil for Peeling or Otherwise Preparing Vegetables and Fruits, of which the following is a specification.

Prior to our invention various attempts have been made to provide an inexpensive, simple, and effective utensil for these purposes whereby the preparation of vegetables and fruits as articles of food might be accomplished more easily and efficiently and the wastage resulting from too heavy paring avoided. No device, so far as we are aware, has heretofore been produced which was entirely satisfactory. In some instances it has been a difficult matter to cleanse the utensil after use. In others it has been adapted to do a single part of the work only—that is to say, the paring of the articles—and another implement had to be employed for removing the eyes or root-stubs or defective parts—as, for instance, a decayed section or other objectionable portion. Also in the preparation of many vegetables and fruits it is desirable to cut them into pieces preparatory to cooking. By our invention we supply in an exceedingly inexpensive and effective manner an implement which is adapted to perform all of the above operations, and it is exceedingly simple in construction, readily cleansed, inexpensive, and effective in operation.

Figure 1:
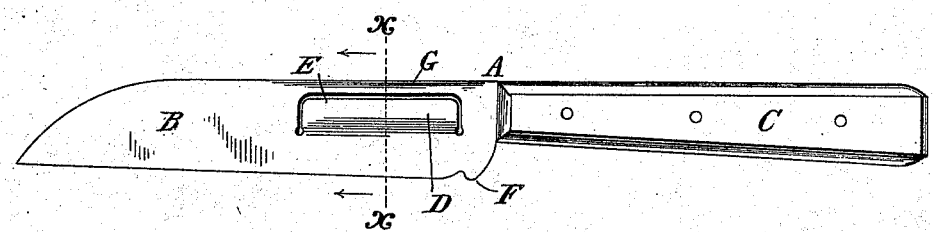
Figure 2:
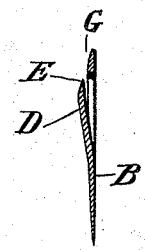

In the drawings, Figure 1 is a side elevation of the invention. Fig. 2 is a vertical sectional view on the line *x x* of Fig. 1.

A is or may be an ordinary culinary knife.
B is the blade.
C is the handle.

At a suitable place in the blade, preferably near the handle, a supplemental cutter D is formed by cutting out from the body of the blade proper by the action of a suitable die and in a manner well known a portion of the steel in such manner that the severance is effected on three sides only—that is to say, adjacent to the back of the blade and at the two ends running crosswise of the blade; but the metal is left uncut across the lower edge of the partially-severed section, as clearly indicated in the drawings, and this partially-severed section is by the action of the die aforesaid bent to one side or the other (to the left side in the drawings) from the plane of the blade proper, so that its upper edge E has lateral projection from the plane of the blade proper sufficient to give the desired thickness of the paring which is to be cut from the vegetable or fruit. This edge, which is the cutting edge of this supplemental blade, is sharpened, as shown in the drawings. Also in order that eyes of potatoes and the root-stubs of certain other vegetables may be more quickly and effectively dug out we provide a projecting part F adjacent to the handle, which may be suitably sharpened whenever the blade is sharpened and whereby the eyes, &c., may be removed without cutting away at the same time any considerable portion of the good part of the vegetable or fruit and much more conveniently than by the employment of the point of the blade. The blade itself is sharpened on its cutting edge, as usual, so that it acts as a knife, as in the ordinary implement of this kind.

It will be observed that our implement is exceedingly simple, that in its operation the blade proper is adapted to perform all the functions of an ordinary knife-blade for cutting, slicing, &c., of the material, whatever it may be, that the supplemental cutter will pare or slice off a shaving of predetermined thickness, and that the plane of the blade proper and the back of it will serve as a guide, whereby the user will be saved all care or thought on the question of adjustment and need not be concerned at all as to the thickness or thinness of the cutting, because it will be impossible for a wastage to occur owing to any undue thickness of the paring, and in order that the back of the blade may slide smoothly and easily over the surface of the vegetable or fruit we prefer to round it off adjacent to the supplemental blade at least, as shown at G, so that it may not abrade the surface of the fruit or vegetable during the paring operation. It will be also noted that the implement may be cleaned as readily as an ordinary knife, a little care being taken to cleanse the recesses adjacent to the ends of the supplemental blade, also that the means provided for removing the eyes of potatoes, root-stubs, &c., are effective and, being close to the handle, are in the most desirable position for easy manipulation and certainty in action.

It will be understood that during operation the paring from the potato, apple, or other fruit or vegetable will pass through the blade proper in the opening produced by the partial severance and lateral bending of the supplemental blade, so that the cutting will be done on one side of the blade proper and the parings will be delivered through it and fall away on the opposite side.

It will be obvious to those who are familiar with this art that modifications may be made in the details of construction of our invention without departing from its essentially valuable features. For example, a hole may be punched completely through the blade proper and the supplemental blade as a separate piece be soldered, brazed, or otherwise attached to the blade proper adjacent to the hole. We do not favor this construction, however, because it unnecessarily adds to the expense, and we prefer that the utensil should be integral so far as possible; also, the eye-removing device F may be a separate part suitably connected to the blade adjacent to the handle.

Having described the invention, we claim—

1. The combination in a culinary utensil of an ordinary flat knife-blade, a handle set in line with the blade, a supplemental blade on the side of the blade proper having its cutting edge presented to the back of the blade proper and an eye-removing projection at the end of the blade adjacent to the handle.

2. The combination in a culinary utensil of an ordinary flat knife-blade, a handle in line with the blade, a supplemental blade cut from the blade proper and lying at an angle thereto, having its cutting edge presented to the back of the blade proper, the back of the blade proper being rounded to afford smooth passage thereof over the surface of the article being pared and an eye-removing projection at the end of the blade which is adjacent to the handle.

Signed this 4th day of February, 1902.

PETER W. NELSON.
CARL STABERG.

Witnesses:
CHAS. W. N. AKBERG,
CHAS. O. WASSON.